Patented May 30, 1933

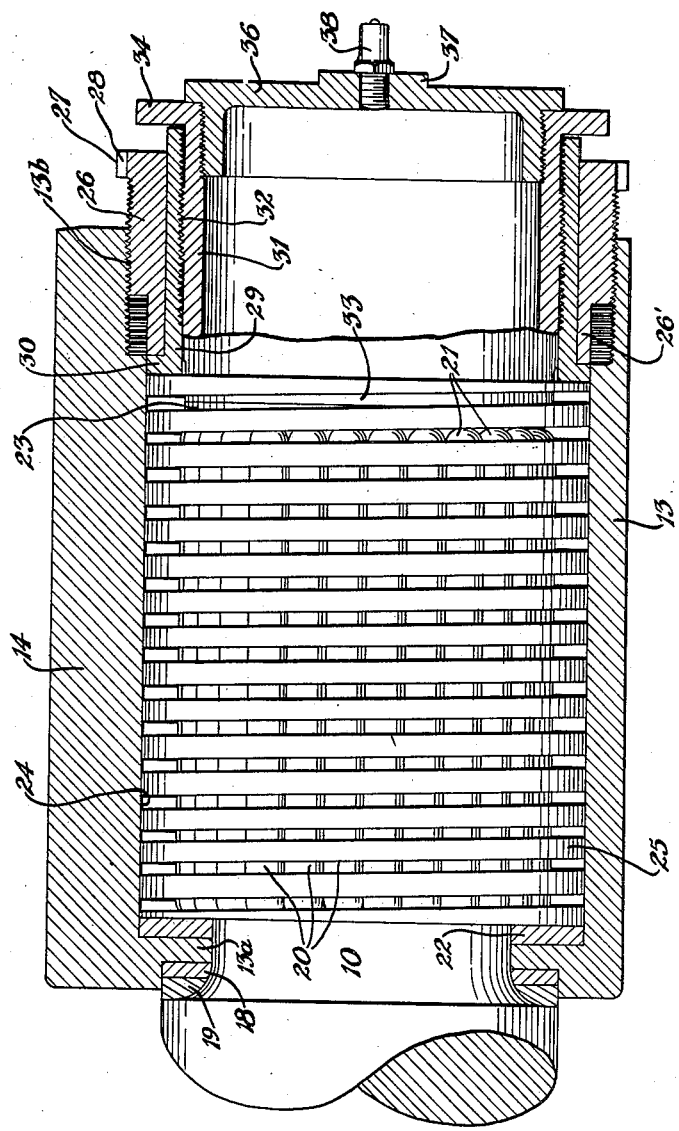

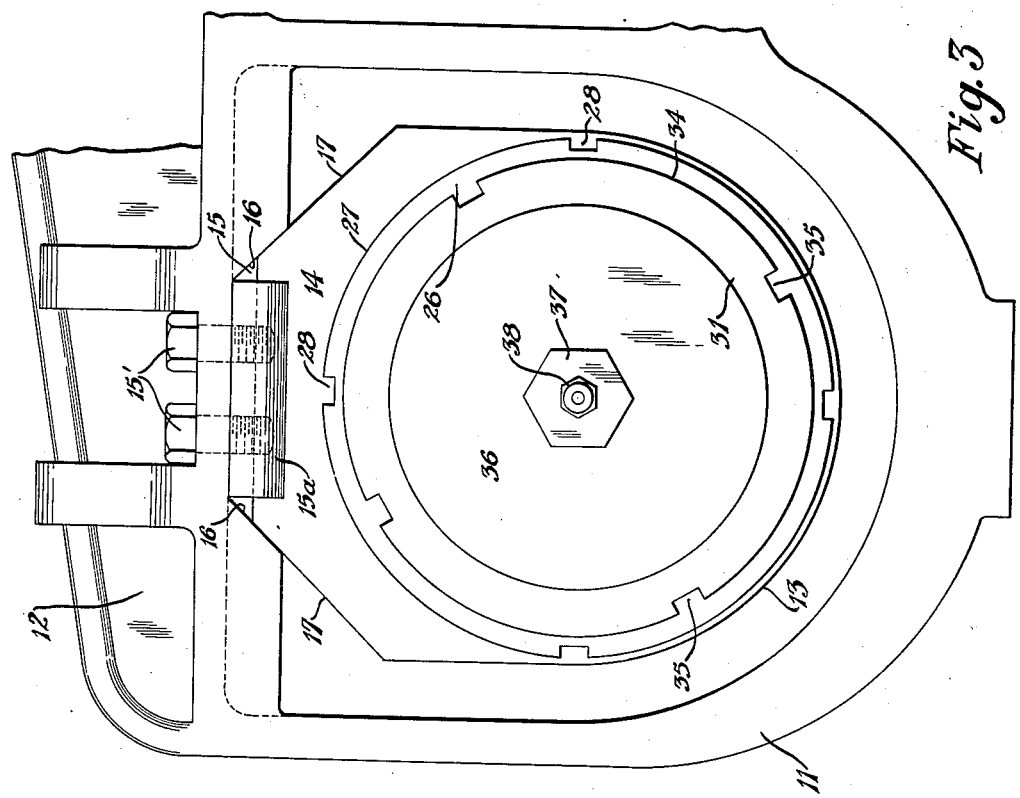
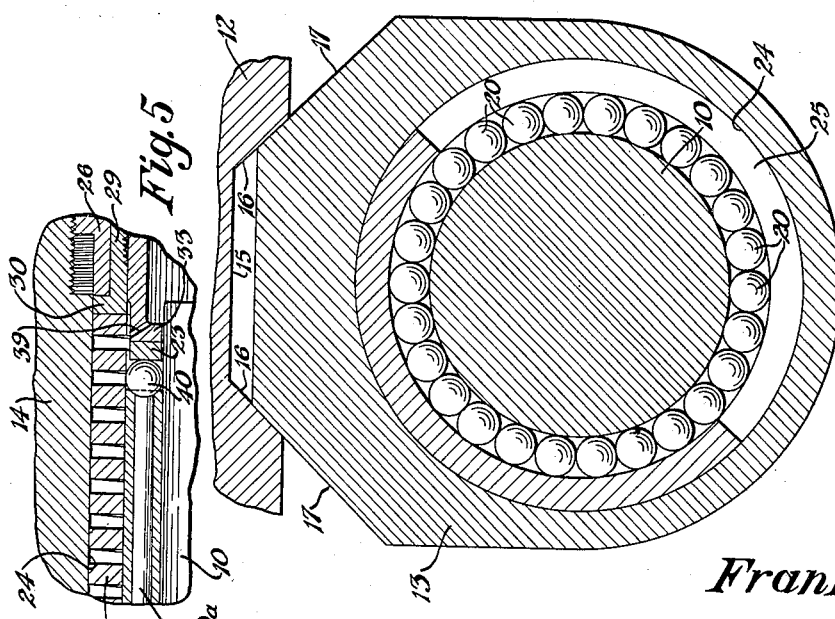

1,912,023

UNITED STATES PATENT OFFICE

FRANK TYSON, OF CANTON, OHIO

ROLLER BEARING

Application filed February 7, 1931. Serial No. 514,134.

The invention relates to roller bearings and more particularly to roller bearings having adjustable means for compensating for wear, and this application is a continuation in part of the subject matter of my prior copending application Serial No. 367,385, filed May 31, 1929.

It has been proposed to employ helical members as inner and outer raceways for roller bearings, but in some instances the helical members were made inexpansible and not adapted to compensate for wear, but were merely used because, due to their flexibility, they readily conformed to the bearing surface of the shaft or outer casing even though having become slightly warped in tempering.

In other instances where it was attempted to employ expansible helical members as inner or outer race members for roller bearings, wedge members were provided to radially expand or contract the race members to either increase their outer diameter or decrease their inner diameter, and take up wear on the rollers and raceways.

It is an object of the present invention to provide a roller bearing having an expansible helical race member, the convolutions of which are adapted to move radially when a longitudinal force is applied to the helical member, thus compensating for wear upon the rollers and raceways, without the use of any wedging means.

Another object is to provide improved means for adjusting the helical race member longitudinally.

A further object is to provide a roller bearing having means for resisting end thrusts in both directions, and means for longitudinally adjusting the end thrust resisting means.

A still further object is to provide a roller bearing for taking up wear, which bearing is extremely simple in construction and operation, and which may be readily substituted for old type bearings in standard railway car bearing boxes without involving any material expense.

These and other objects are attained by the parts, combinations and improvements which comprise the present invention, and which may be stated in general terms as including a plurality of rollers rolling on the axle shaft, an expansible helical spring having straight cylindrical inner and outer sides and being interposed between the rollers and the barrel, thrust collars being provided for contact with both ends of the rollers, and sleeves adjustable relative to each other for longitudinally adjusting the helical spring and the thrust collars.

A preferred embodiment of the present improvements is illustrated in the accompanying drawings, in which Figure 1 is a fragmentary longitudinal sectional view of a standard Bettendorf bearing box carried on a railway car wheel axle, showing the improved bearing mounted on the axle within the box;

Fig. 2 is a longitudinal sectional view of the improved bearing detached from the box, showing the helical spring in elevation;

Fig. 3 is an end elevation of the bearing and box shown in Fig. 1;

Fig. 4 is a sectional view as on line 4—4, Fig. 1; and

Fig. 5 is a fragmentary sectional view of the bearing showing a modified form of roller.

Similar numerals refer to similar parts throughout the several views of the drawings.

Figure 1:
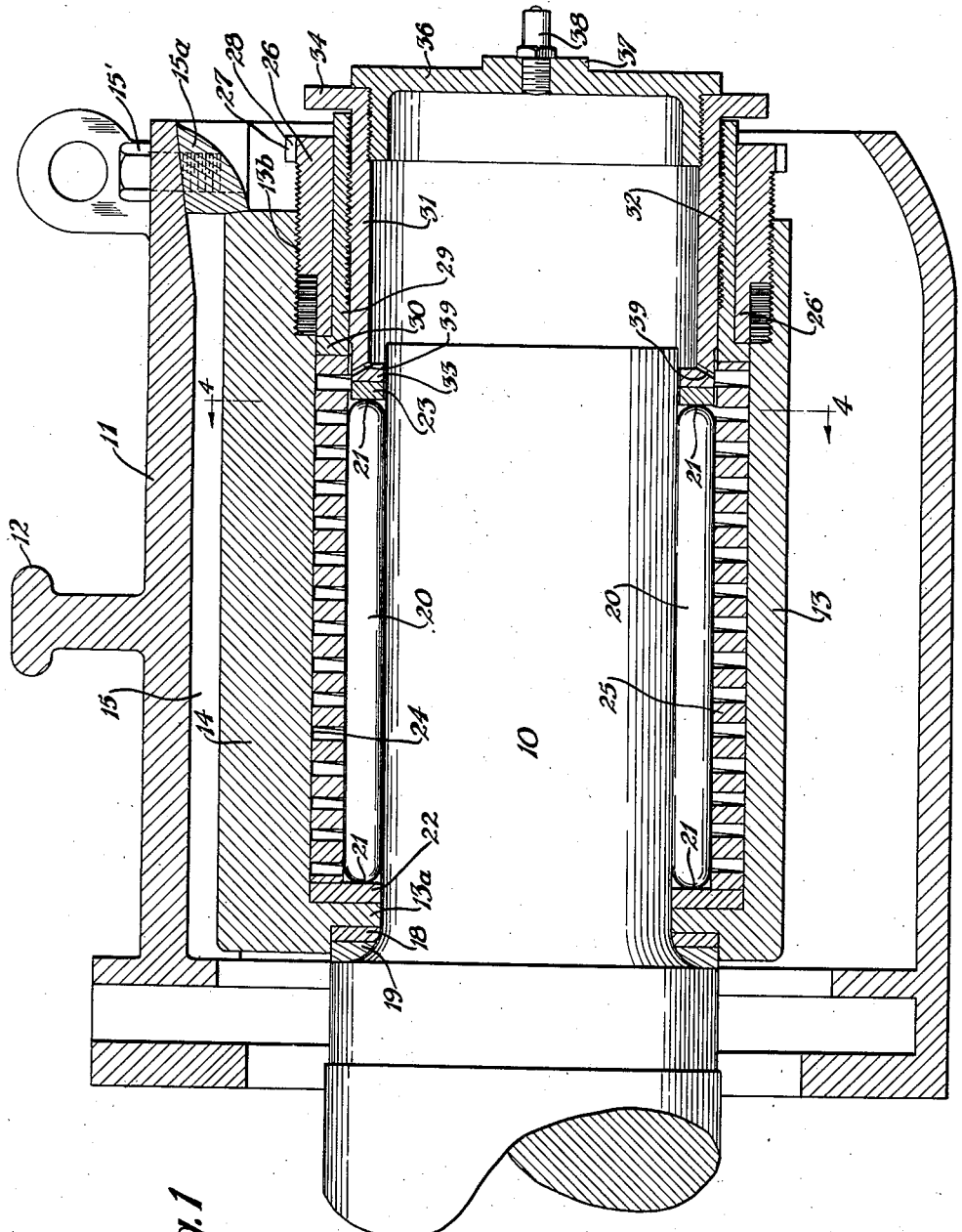

A portion of a car wheel axle, having an outer cylindric surface and constituting the inner member of the bearing, is shown at 10 mounted within a standard Bettendorf box 11 formed on the truck 12.

The improved bearing to which the invention pertains is adapted to be located within the box 11, and has a casing or barrel 13 constituting the outer member of the bearing and provided with the truck supporting portion 14 at the top thereof. The upper wall of the box 11 is provided with an inverted channel 15 extending longitudinally through the box, and provided with the oppositely inclined side walls 16 forming a channel of trapezoidal shape. The upper portion 14 of the barrel 13 is beveled on its sides as at 17, and is adapted to be inserted into the channel 15 as best shown in Fig. 4, so that the inclined sides 16 of the channel wedgeably engage the beveled side faces 17 of the barrel and the truck 12 is supported by the bearing at the top of the beveled barrel side faces 17.

At the outer end of the channel 15, a bearing retaining lug 15a is secured to the bearing box as by screws 15'; and the inner face of the lug is adapted to engage the outer surface of the upper end portion 14 to maintain the bearing in position within the box 11.

The barrel 13 is provided with an internal annular flange 13a at its inner end and with an enlarged internally screw threaded opening 13b at its outer end.

The flange 13a is recessed at the end of the barrel to incase two steel washers 18 and 19 shaped to fit the filleted portion of the axle 10.

Rollers 20 surround the axle 10 preferably in rolling contact therewith, and are preferably provided with rounded ends 21 contacting with thrust collars 22 and 23 located within the barrel, the collar 22 being located against the internal flange 16 of the barrel.

The inner cylindric surface 24 of the barrel is radially spaced from the axle 10 preferably to receive a helical coil spring 25 preferably between the rollers and the cylindric surface 24. The spring 25 may be formed of a coiled bar of polygonal and preferably rectangular cross section; or it may be spirally cut from a cylinder having a thickness equal to the desired cross sectional thickness of the convolutions of the spring, and the surfaces determined by the inside and outside parallel faces of the helix are preferably cylindrical, the elements thereof being parallel with the axis of the axle 10.

The inner surface 24 of the barrel and the outer face of the spring 25 may be ground cylindric to conform to each other, and the inner surface of the spring 25 is preferably ground cylindric to form the outer raceway for the rollers 20.

Means for compressing the spring 25 longitudinally preferably includes a sleeve 26 screwed into the threaded opening 17 of the barrel and provided with an outturned annular flange 27 having the spanner wrench notches 28 therein. The inner end portion 26' of the sleeve 26 is reduced in thickness and adapted to slidably fit within the inner cylindric surface 24 of the cup 13.

An inner sleeve 29 slidably fits within the sleeve 26, and is provided at its inner end with the annular outturned flange 30 adapted to abut the inner end 26' of the sleeve 26 and slidably fit within the inner cylindric surface 24 to engage the end of the spring 25.

The sleeve 29 is screw threaded internally throughout the greatest portion of its length, and an inner thrust resisting sleeve 31 is screwed into the sleeve 29. The sleeve 31 is preferably provided with external screw threads over a relatively small portion of its length intermediate its ends as shown at 32, and has an inturned annular flange 33 at its inner end adapted to abut the thrust collar 23. At its other end the sleeve 31 is provided with an outturned annular flange 34 having spanner wrench notches 35 therein.

Thus it will be seen that the spring engaging sleeve 29 is held against longitudinal movement by engagement of its flange 30 with the reduced end portion 26' of the sleeve 26, which latter sleeve is screwed into the barrel 13, and the thrust resisting sleeve 31 is held against longitudinal movement by screw threaded engagement with the sleeve 29 as at 32.

The sleeve 31 is prferably provided with internal screw threads at its outer end portion and a closure plug 36 is screwed therein and preferably provided with a hexagonal boss 37 in which is screwed the Alemite grease fitting 38. The hexagonal boss provides means for applying a suitable wrench to the closure plug 36.

Apertures 39 may be provided at the inner end of the sleeve 31 communicating with the annular chamber containing the spring 25, for the purpose of supplying a lubricant thereto.

When the spring 25 is compressed longitudinally the convolutions thereof will tend to expand radially due to the change of their pitch and increase the outer diameter of the helix. But since such radial expansion is prevented by the engagement of the outer faces of the helix with the inner cylindric surface of the barrel, longitudinal compression of the spring will cause it to wind upon itself, thereby resulting in a combined bending and twisting of the helix with respect to its longitudinal helicoidal axis.

Accordingly the inner and outer parallel faces of the helix will be distorted by twisting from their initial position, thereby decreasing the effective inner diameter of the helix constrained as aforesaid in the barrel.

The change in the over all dimensions of the helix caused by the bending and twisting, is also accompanied by form changes in the transverse cross sectional area of the helix by reason of the fact that strains along the axis of any bar or member, such as the helix member are accompanied by lateral strains in directions at right angles to the axis, tensile stress producing a contraction, and compressive stress producing an extension in the direction at right angles to the axis. (See Fuller & Johnson, "Applied Mechanics" New York 1919, vol. II, Strength of Materials, page 6.)

In other words with the normally rectangular cross section of the helix as illustrated, the compression strain along the helicoidal axis of the helix, causes an outward bulging of the narrower parallel rectangular inner and outer faces of the helix.

The distortion arising from this effect combines with the distortion arising from the bending and twisting as aforesaid to achieve the purposes of the invention and permit the taking up of wear in the improved bearing.

That is, the effect of this twisting and/or bulging resulting from longitudinal compression of helical spring is to increase the radial distance between its inner and outer faces, and since radially outward movement is prevented by abutment of the spring with the inner cylindric surface of the barrel, the effective inner diameter of the spring will be decreased.

When it is desired to take up wear in the bearing, the sleeve 31 is first screwed outwardly on the sleeve 29 away from the ends of the rollers 20, by applying a wrench to the notches 35. By applying the wrench to the notches 28, the outer sleeve 26 is then screwed into the cup, forcing the flange 30 longitudinally against the end of the spring 25 to decrease the inner diameter of the helix and take up wear.

It is noted that with the improved means for compressing the spring 25, the sleeve 29 is moved longitudinally against the end of the spring without rotating, the sleeve 26 turning on the outer cylindric surface of the sleeve 29. The advantage of this construction is that the spring does not bind upon being compressed due to friction between its end and the member applying the compressing force.

After the spring has been compressed sufficiently to take up the wear, the wrench is applied to the sleeve 31 to screw the same inwardly on the sleeve 29 until the flange 33 abuts the collar 23 applying the thrust resisting force thereto.

Thus a simple and compact bearing is provided having a single helical race member adapted when compressed to compensate for wear without the use of wedging means, and having improved means for compressing the helical race member and providing adjustable end thrust resisting means.

As illustrated in the drawings the improved bearing is adapted to be readily installed in a standard journal box without modifying the construction thereof.

In the modified form illustrated in Fig. 5 the rollers are preferably tubular as shown at 20a, a ball 40 fitting partially within each end of the roller for contact with the thrust collars.

I claim:

1. A roller bearing including an axle, a barrel concentric with and surrounding the axle and having an inner cylindric surface, rollers surrounding the axle within the barrel, a helical spring surrounding the rollers and having a polygonal cross section and inner and outer faces, the inner face abutting the rollers and the outer face abutting the inner surface of the barrel, and means for compressing the spring longitudinally.

2. A roller bearing including an axle, a barrel concentric with and surrounding the axle and having an inner cylindric surface, rollers surrounding the axle within the barrel, a helical spring surrounding the rollers and having a polygonal cross section and inner and outer faces, the inner face abutting the rollers and the outer face abutting the inner surface of the barrel, and an adjusting screw for compressing the spring longitudinally.

3. A roller bearing including an axle, a barrel concentric with and surrounding the axle and having an inner cylindric surface, rollers surrounding the axle within the barrel, a helical spring surrounding the rollers and having a polygonal cross section and inner and outer faces, the inner face abutting the rollers and the outer face abutting the inner surface of the barrel, means for compressing the spring longitudinally, a fixed thrust collar contacting with one end of the rollers and an adjustable thrust collar contacting with the other end of the rollers.

4. A roller bearing including an axle, a barrel concentric with and surrounding the axle and having an inner cylindric surface, rollers surrounding the axle within the barrel, a helical spring surrounding the rollers and having a polygonal cross section and inner and outer faces, the inner face abutting the rollers and the outer face abutting the inner surface of the barrel, means for compressing the spring longitudinally, a fixed thrust collar contacting with one end of the rollers, an adjustable thrust collar contacting with the other end of the rollers, and a screw contacting with the adjustable collar.

5. A roller bearing including an axle, a barrel concentric with and surrounding the axle and having an inner cylindric surface, rollers surrounding the axle within the barrel, a helical spring surrounding the rollers and having a polygonal cross section and inner and outer faces, the inner face abutting the rollers and the outer face abutting the inner surface of the barrel, an adjusting screw for compressing the spring longitudinally, a fixed thrust collar contacting with one end of the rollers, and an adjustable thrust collar contacting with the other end of the roller.

6. A roller bearing including an axle, a barrel concentric with and surrounding the axle and having an inner cylindric surface, rollers surrounding the axle within the barrel, a helical spring surrounding the rollers and having a polygonal cross section and inner and outer faces, the inner face abutting the rollers and the outer face abutting the inner surface of the barrel, an adjusting screw for compressing the spring longitudinally, a fixed thrust collar contacting with one end of the rollers, an adjustable thrust collar contacting with the other end of the rollers, and a screw contacting with the adjustable collar.

7. A roller bearing including an axle, a barrel concentric with and surrounding the axle, rollers surrounding the axle within the barrel, an expansible helical spring having parallel inner and outer faces fitting between the rollers and the barrel, a longitudinally movable sleeve provided with a flange at one end abutting the end of the spring, and an outer adjusting sleeve slidably mounted on the longitudinally movable sleeve and having one end abutting the flange, the outer adjusting sleeve being screwed into the barrel for moving the longitudinally movable sleeve to compress the spring.

8. A roller bearing including an axle, a barrel concentric with and surrounding the axle, rollers surrounding the axle within the barrel, an expansible helical spring having parallel inner and outer faces fitting between the rollers and the barrel, a longitudinally movable sleeve provided with a flange at one end abutting the end of the spring, and an outer adjusting sleeve slidably mounted on the longitudinally movable sleeve and having one end abutting the flange, the outer adjusting sleeve being screwed into the barrel for moving the longitudinally movable sleeve to compress the spring, and an inner end thrust resisting sleeve screwed into the longitudinally movable sleeve.

9. A roller bearing including an axle, a barrel concentric with and surrounding the axle and having an inner cylindrical surface, rollers surrounding the axle within the barrel, a helical coil spring of rectangular cross section surrounding the rollers and having its inner face abutting the rollers and its outer face abutting the inner surface of the barrel, and means for compressing the coil longitudinally to decrease the internal diameter thereof.

10. A roller bearing including an axle, a barrel concentric with and surrounding the axle and having an inner cylindrical surface, rollers surrounding the axle within the barrel, a helical coil spring of rectangular cross section surrounding the rollers and having its inner face abutting the rollers and its outer face abutting the inner surface of the barrel, and an adjusting screw for compressing the coil longitudinally to decrease the internal diameter thereof.

11. A roller bearing including an inner member having an outer cylindric surface, an outer member having an inner cylindric surface, rollers interposed between the cylindric surfaces and rolling on one of them, a helical spring interposed between and abutting the rollers and the other cylindric surface, the helical spring having inner and outer faces and a transverse cross section such that compression of the helical spring longitudinally of itself and of the rollers increases the radial distance between the inner and outer faces of the spring, and means for compressing the helical spring longitudinally of itself and of the rollers.

In testimony that I claim the above, I have hereunto subscribed my name.

FRANK TYSON.